United States Patent
Gregorat et al.

(10) Patent No.: US 8,325,905 B2
(45) Date of Patent: Dec. 4, 2012

(54) ROUTING CALLS IN A NETWORK

(75) Inventors: Mariafranca Gregorat, Dallas, TX (US); Steven L. Lass, Allen, TX (US); Richard L. McClain, Frisco, TX (US); Timothy Dwight, Richardson, TX (US); James L. Verlare, Colorado Springs, CO (US); Gregory Welch, Somerset, NJ (US); Yaron Raps, Brooklyn, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1724 days.

(21) Appl. No.: 11/460,668

(22) Filed: Jul. 28, 2006

(65) Prior Publication Data

US 2007/0061397 A1    Mar. 15, 2007

Related U.S. Application Data

(60) Provisional application No. 60/703,812, filed on Jul. 29, 2005, provisional application No. 60/764,748, filed on Feb. 3, 2006.

(51) Int. Cl.
*H04M 7/00* (2006.01)
*H04M 1/56* (2006.01)

(52) U.S. Cl. .............. 379/220.01; 379/142.01

(58) Field of Classification Search ........... 379/220.01, 379/142.01; 709/203, 227
See application file for complete search history.

(56) References Cited

U.S. PATENT DOCUMENTS

| 6,282,281 | B1 | 8/2001 | Low |
| 7,031,747 | B2 | 4/2006 | Cyr et al. |
| 2006/0206504 | A1* | 9/2006 | Cai et al. ................ 707/100 |

FOREIGN PATENT DOCUMENTS

WO    2004/008786    1/2004

OTHER PUBLICATIONS

Lis, Sophia Antipolis, "Digital cellular telecommunications system (Phase 2+); Universal Mobile Telecommunications System (UMTS); IP Multimedia Subsystem (IMS); Stage 2 . . .," ETSI Standards, Cedex, France, vol. 3-SA2, No. V6.10.0, pp. 1-181, Jun. 1, 2005.
Lis, Sophia Antipolis, "Telecommunications and Internet converged Services and Protocols for Advanced Networking (TISPAN); ENUM scenarios for user and infrastructure ENUM; . . .," ETSI Standards, Cedex, France, vol. TISPAN, No. V1.1.1, pp. 1-25, May 1, 2005.

* cited by examiner

*Primary Examiner* — Rasha Al Aubaidi

(57) ABSTRACT

A method includes receiving a telephone number mapping query associated with a call. The method may also include generating routing information based on the query and forwarding the routing information to a control device. The routing information may indicate that processing associated with routing the call is to bypass a core portion of an Internet multimedia subsystem (IMS) when a calling party associated with the call does not invoke an IMS service, the called party associated with the call does not invoke an IMS service and the called party is not an IMS subscriber.

21 Claims, 7 Drawing Sheets

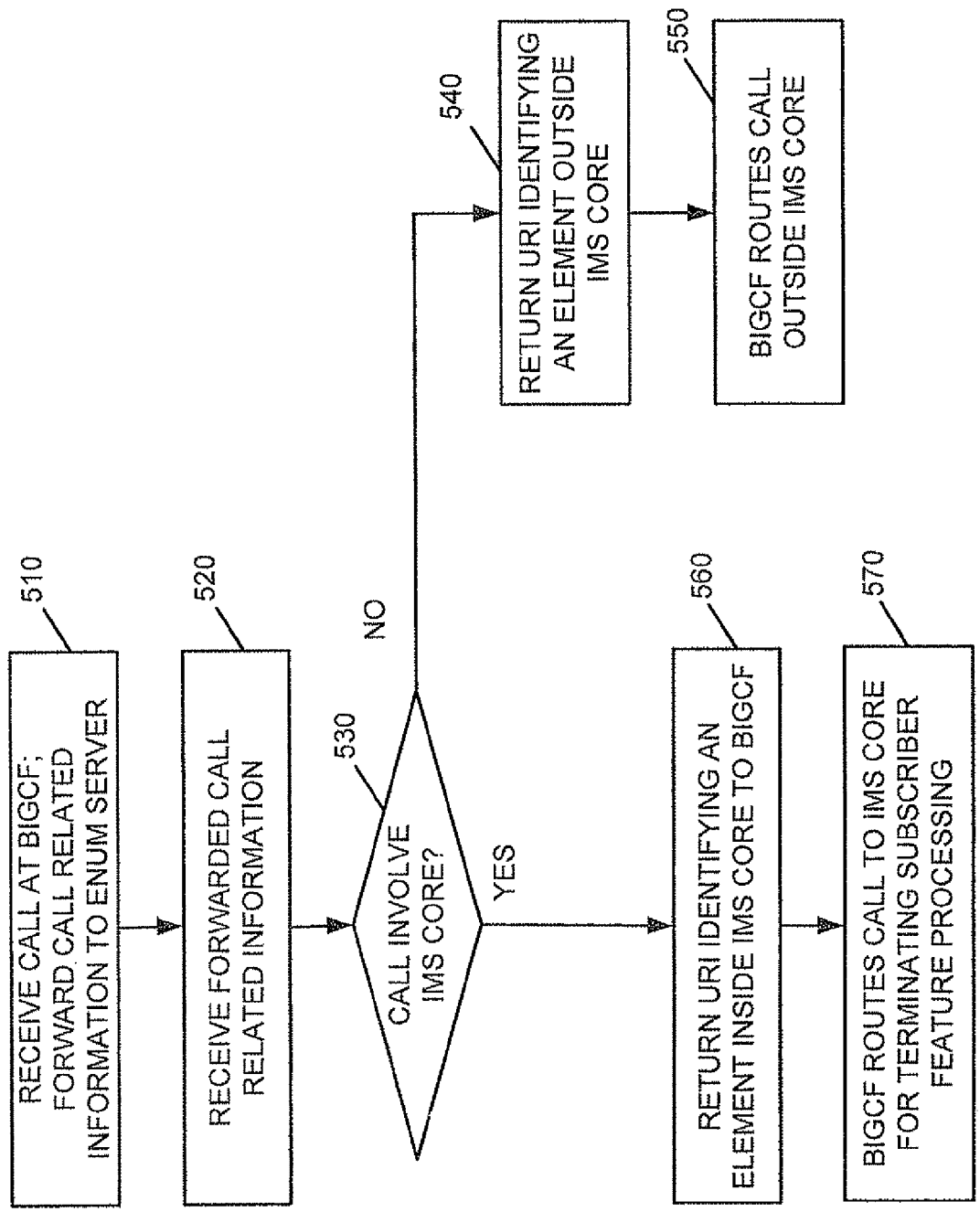

ROUTING CALLS IN A NETWORK

PRIORITY INFORMATION

The present application claims priority to U.S. Provisional Patent Application No. 60/703,812, filed on Jul. 29, 2005, and U.S. Provisional Patent Application No. 60/764,748 filed on Feb. 3, 2006. The entire contents of both provisional applications are incorporated herein by reference in their entireties.

BACKGROUND INFORMATION

The Internet Protocol Multimedia Subsystem (IMS) provides mobile and fixed multimedia services. The aim of IMS is to provide both current and future services via the Internet. IMS gives network operators and service providers the ability to control and charge for each service. In addition, users are provided with the ability to execute services from their home computers/networks, as well as via their mobile devices.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 5 and 6 illustrate exemplary processing by various devices illustrated in FIG. 1.

DETAILED DESCRIPTION OF PREFERRED EMBODIMENTS

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention relate to routing traffic in relation to an Internet Protocol (IP) Multimedia Subsystem (IMS) (also referred to as an "IMS core" or "IMS platform"). The IMS core may be used for routing multimedia calls/data sessions from various originations towards various destinations with possible invocation of value-added service during processing and routing determinations. Calls not involving IMS subscriber endpoints or IMS-based applications may be bypass the IMS core (e.g., be routed around the IMS core).

It will be appreciated that the telephony terminology that is used herein covers the United States based public switched telephone network (PSTN) structure. Implementations consistent with principles of the invention are not so limited. For example, implementations consistent with principles of the invention are equally applicable to other communication networks.

Exemplary System

Figure 1:
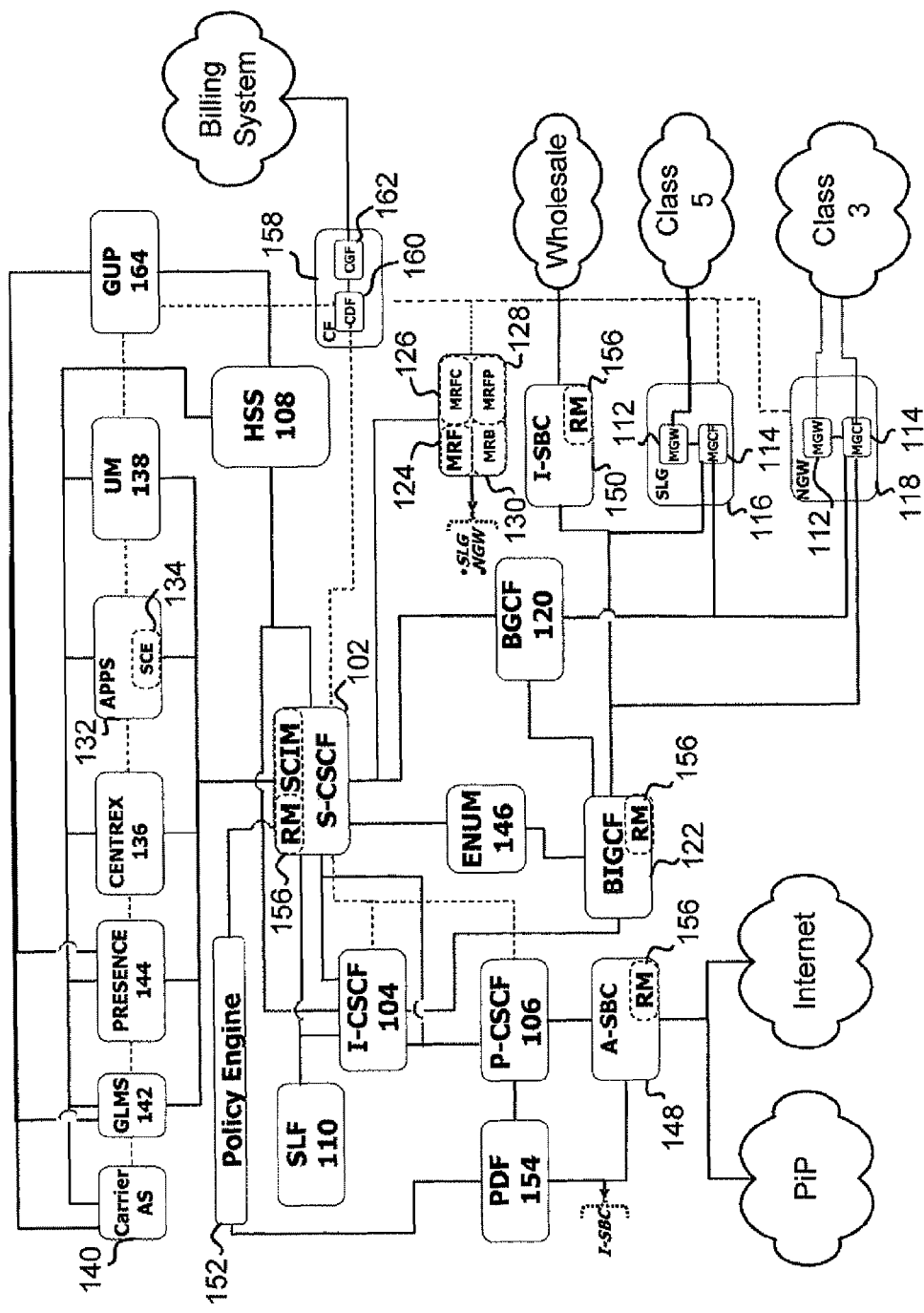
FIG. 1 illustrates an exemplary system in which methods and systems consistent with principles of the invention may be implemented.

FIG. 1 illustrates an exemplary system 100 in which methods and systems and methods consistent with the principles of the invention may be implemented. As illustrated, system 100 may include a serving call session control function (S-CSCF) 102, an interrogating call session control function (I-CSCF) 104, a proxy call session control function (P-CSCF) 106, a home subscriber server (HSS) 108, a subscription location function (SLF) 110, two media gateway (MGW) functions 112, two media gateway control functions (MGCFs) 114, a shared local gateway (SLG) 116, a network gateway (NGW) 118, a breakout gateway control function (BGCF) 120, a break in gateway control function (BIGCF) 122, a multimedia resource function (MRF) 124 that may include a multimedia resource function controller (MRFC) 126, a multimedia resource function processor (MRFP) 128, and media resource broker (MRB) 130, one or more application servers 132, a services creation environment (SCE) logic 134, a hosted Internet Protocol central office exchange service (CENTREX) (HIPC) 136, a unified messaging service (UM) 138, a carrier application service (AS) 140, a group list management server (GLMS) 142, a presence service 144, a telephone number mapping (ENUM) server 146, an access session border controller (A-SBC) 148, an internetworking session border controller (I-SBC) 150, a policy engine 152, a policy decision function (PDF) 154, a resource management function (RM) 156, a charging function (CF) 158, a charging data function (CDF) 160, a charging gateway function (CGF) 162, and a generic user profile (GUP) 164. The number of components illustrated in FIG. 1 is provided for simplicity. In practice, a typical system could include more or fewer components than illustrated in FIG. 1.

A. Call Session Control Components

S-CSCF 102, I-CSCF 104, and P-CSCF 106 may be considered call session control components in system 100. The call control components may be responsible for parsing a session (e.g., a session initiation protocol (SIP) session) and applying logic (e.g., business logic, service logic, operational logic, etc.) on a per event basis. The outcome of the session control may be to either route an event to the appropriate components and/or append SIP headers and values.

S-CSCF 102 may be viewed as the brain of the IMS core. The term "IMS core" as used herein may refer to and include the call session control components (i.e., S-CSCS 102, I-CSCF 104, P-CSCF 104). The IMS core may also include HSS 108 and/or other elements associated with providing IMS related services. Other components in system 100, such as BGCF 120 and BIGCF 122, may represent non-core IMS components. S-CSCF 102 may perform session control and registration services for the users of the IMS platform. S-CSCF 102 may receive a user profile from HSS 108 and route sessions requested by an IMS user (also called an "IMS subscriber" or "subscriber"). Additionally, S-CSCF 102 may perform user authentication based on information from HSS 108.

In some implementations, S-CSCF 102 may include a Service Capability Interaction Manager (SCIM) and Resource Management (RM) functions. The SCIM may be responsible for orchestrating the offerings of one or more application services across various service enabling technologies and platforms to produce valued services for IMS users. The RM may be responsible for executing business rules and service level agreements (SLAs) by allocating the appropriate resources.

I-CSCF 104 may act as the main point of contact for connections to subscribers served by other IP networks. I-CSCF

104 may be located at the edge of the IMS core. I-CSCF 104 may receive SIP messages and identify the next hops for the SIP messages. To achieve this, I-CSCF 104 may query HSS 108 for the location (e.g., an address) of the appropriate S-CSCF to which a particular SIP message is to be forwarded.

P-CSCF 106 may act as the main point of contact for connections to subscribers of the local IMS. As such, P-CSCF 106 may validate requests, forward the requests to selected destinations, process and forward the responses. P-CSCF 106 may generate chargeable events and send information relating to the chargeable events to CF 158. Additionally, P-CSCF 106 may interact with PDF 154 to grant, reject, or downgrade a session request based on platform resources and quality of service (QoS) measurements.

HSS 108 may include one or more servers that act as the central repository for user-related information. HSS 108 may contain user-related subscription information for handling multimedia sessions. Some of the information contained in HSS 108 may include information identifying the location of a particular S-CSCF 102 for a particular user. As indicated above, the location of a particular S-CSCF 102 may be conveyed to I-CSCF 104 upon receiving a query from a network element. HSS 108 may also include user profile information that contains service trigger points and the corresponding resources (e.g., applications, media, services, etc.) that offer the services. The user profile information may be forwarded to S-CSCF 102 for session control and service treatment. Moreover, HSS 108 may provide and receive updates directly from application servers 132.

SLF 110 may include one or more databases that contain service location information for subscribers. SLF 110 may receive a query, containing identification information for a subscriber, from I-CSCF 104 and return, based on the subscriber identification information, information identifying an HSS 108 that serves the subscriber.

B. Gateways and Gateway Control Functions

System 100 may include various components that bridge the IMS core to external networks, such as a public switched telephone network (PSTN), the Internet, etc. These components, which may include MGW function 112, MGCF 114, SLG 116, NOW 118, BGCF 120, and BIGCF 122, may perform protocol conversion and event routing to or from the IMS platform.

MGW function 112 may connect PSTN networks and the IMS core. In one implementation, MGW function 112 may terminate bearer channels from a PSTN network and media steams from the IMS core (e.g., real-time transport protocol (RTP) streams in an IP network or asynchronous transfer mode adaptation layer 2 (AAL2)/ATM connections in an ATM backbone), execute the conversion between these terminations, and perform transcoding and signal processing. In addition, MOW function 112 may provide tone announcements to circuit switched (CS) users. In one implementation consistent with the principles of the invention, MGW function 112 may operate under the control of MGCF 114.

MGCF 114 may be part of the gateway infrastructure that enables communication between IMS and PST networks. MGCF 114 may perform protocol conversion between the ISDN User Part (ISUP) or Primary Rate Interface (PRI) and SIP protocols before forwarding a session to the IMS platform. In similar fashion, IMS-originated sessions directed towards PSTN users may traverse MGCF 114. MGCF 140 may control media channels in MOW 112. In addition, MGCF 114 may report account information to CF 158.

SLG 116 may include an MGCF 114 and a set of associated MGW 112 entities within the same physical entity. SLG 116 may connect the IMS platform to the local exchange layer of the PSTN. In one implementation, the interfaces between SLG 116 and the local exchange networks may include digital signal 0 (DS0) or digital signal 1 (DS1)-based Non-Facilities Associated Signaling (NFAS) PRIs.

NGW 118 may include an MGCF 114 and a set of associated MGW 112 entities which may physically reside in separate physical entities. NGW 118 may connect the IMS platform to the long distance layer of the PSTN. In one implementation, the interfaces between MGCF 114 of NGW 118 and the long distance networks may include DS0 or DS1-based signaling system 7 (SS7) interfaces and the interfaces between MGW 112 of NGW 118 and the long distance networks may include DS1-bearer channels.

BGCF 120 may connect IMS-initiated calls to a Circuit Switch (CS) customer (e.g., an IMS user calling a telephone number in the PSTN). BGCF 120 may, based on a routing policy, select an appropriate network in which the connection is to be made or may select the appropriate MGCF to the other network.

BIGCF 122 may correspond to an ingress point that handles incoming calls from Wholesalers, PSTN gateways (e.g., NGW 118, SLG 116, I-SBC 150), wholesale gateways (which may require prepaid authorization for non-emergency calls), other IP-based carriers (e.g., based on VoIP peering agreements), Emergency Services Peering Points, etc. BIGCF 122 may route calls to the IMS core, when the calls are destined for IMS subscribers or when IMS services are to be invoked, or may bypass the IMS core elements (P-CSCF 106, I-CSCF 104, S-CSCF 102, HSS 108, etc.) when the calls are destined for non-IMS subscribers and no IMS services are invoked by the calling party or called party. BIGCF 122 may route calls to PSTN-based termination points to BGCF 120 and route calls to IP-based termination points (e.g., to wholesale, IP-based carriers, etc.) directly to I-SBCs 150 associated with the IP-based termination points. BIGCF 122 may include static routing policies to route emergency calls to BGCF 120. BGCF 120 may also support static routing policies to route non-emergency calls from certain originations (e.g., wholesale gateway requiring prepaid authorization for non-emergency calls) to pre-paid service controllers. If calls are either from and/or to IMS subscribers or IMS services are invoked, BIGCF 122 may route the calls to the IMS platform using I-CSCF 104 to invoke calling and/or called party features.

BIGCF 122 may include a group of configuration data. For example, BIGCF 122 may maintain a list of served hosts. If a request uniform resource identifier (R-URI) in the incoming request does not identity one of the served hosts, BIGCF 122 may either proxy the call externally to an address resolved by a domain name service (DNS) service (SRV) record or reject the call by sending a session initiation protocol (SIP) 403 response (or other type of message), unless the call is an emergency call. In this way, BIGCF 122 may reject calls destined for unknown entities.

BIGCF 122 may also include a list of emergency prefixes on a per country basis. For example, BIGCF 122 may store the prefix 911 for the United States. BIGCF 122 may store a list of non-geographic numbers per country of origin (e.g., 800, 411, etc.). Via this list, BIGCF 122 may route calls directly for PST breakout.

BIGCF 122 may further store a list of originating hosts (e.g., gateway uniform resource locators (URLs)) from which calls may be expected. If a call is not from one of the hosts in the list of origination hosts (either in the second topmost via or first via), BIGCF 122 may reject the request. The originating host based data may include a number of data elements. For example, the data elements may include a gateway IP address of one or more hostnames. The originating hosts may point to prefix/suffix information to normalize the calling party number. For example, a wholesale gateway origination may have a rule indicating that if 7 digits are given in the calling party number, then prefix the calling party number with +1732. The suffix information may indicate how many digits to consider after the suffix.

The originating hosts may identify a location of the calling party identity indicators. For example, the originating hosts may identify from which header in a SIP INVITE message to retrieve the calling party information.

The data elements may also include the country or location of the gateway. This location may be used by BIGCF 122 to normalize the called party number, based on the country of origination of the call. The location of the gateway may also be used by BIGCF 122 to identify a location of a gateway to which an emergency call is to be routed.

The data elements may further include a list of blocked prefixes from each origination host. For example, 1900* may indicate that "1-900" calling is blocked from this gateway. The data elements may further include an outbound route for each origination host. For example, non-emergency calls from a given host may be routed to a configured host, such as a pre-paid service controller.

In addition to the above data, BIGCF 122 may be configured with the following data: a variable to either allow or reject processing of an INVITE where the request URI does not match one of the configured served hosts; an option per originating domain or IP address to accept or reject the request; an option to process certain SIP requests; a prefix per origination that is not allowed; static routing rules based on prefix matching; a server group pointing to a farm of ENUM servers; a server group pointing to a farm of I-CSCF servers for routing to the IMS core; a server group pointing to a farm of BGCF servers for bypassing the IMS core and routing directly to BGCF 120; a server group pointing to a farm of Emergency Services Positioning Servers (e.g., part of the U.S. emergency service network); an option to specify that certain message(s) are to be directed to an error log or an on-screen display; an option to place a gateway in service and place a gateway out-of-service in BIGCF 122; country codes needed for number normalizations; number normalization rules (e.g., based on originating gateway); an option for enabling or disabling logging categories; an option for enabling or disabling alarms; and an option for enabling or disabling metrics.

In one implementation, BIGCF 122 may connect to I-CSCF 104, SLG 116, NGW 118, and BGCF 120 via SIP interfaces. Additionally, BIGCF 122 may connect to ENUM 146 via a DNS protocol interface.

C. Media Resource Function (MRF)

The IMS core may provide shared multimedia services. Examples of multimedia services (or applications) include playing announcements, audio/video recording and playback, interactive voice response (IVR), fax reception and transmission, automatic speech recognition (ASR), text-to-speech (TTS) sessions, multimedia conferencing, customized ring back tones, push-to-talk over cellular (PoC), video messaging, etc. MRF 124 may be part of the IMS platform and may support services that require multimedia streams.

As illustrated in FIG. 1, MRF 124 may include MRFC 126, MRFP 128, and MRB 130. MRFC 126 and MRFP 128 are the IMS resources that provide support for bearer-related services (e.g., multi-party sessions, announcements to a user, bearer transcoding, etc.). MRFC 126 may provide bearer control-related services. MRFP 128 may provide user plane resources that may be requested and instructed by MRFC 126. MRB 130 may provide a resource management function that is able to allow media resources to become common resources shared among multiple applications.

D. Application Servers

Application servers 132 may include one or more servers that provide enhanced audio, video, messaging and data services within the application layer of system 100. Application servers 132 may be accessible to the users of the IMS platform and provide value added multimedia services to those users. Application servers 132 may submit charges to the IMS platform for the services that application servers 132 provide to the IMS user community.

Two types of application servers 132 that may be used within system 100 may include micro applications and macro applications (or macro application services). Micro applications may be provided on a common Services Delivery Platform through the use of a Services Creation Environment (SCE) 134. Micro applications may include a wide variety of enhanced multimedia services that need a rapid development and deployment cycle. Examples of macro application services include Hosted IP CENTREX (HIPC) 136, Unified Messaging (UM) 138, and Carrier Application Service 140.

HIPC 136 may correspond to a type of Private Branch Exchange (PBX) service in which switching occurs at a local telephone office instead of at the company premises where the traditional PBX is located. In one implementation, HIPC 136 may be replaced or supplemented with a SIP Voice Features server. Unified messaging 138 may allow users to be able to retrieve and send voice messages from a single interface, regardless of the technology (e.g., telephone, personal computer, etc.) and other unified messaging services (e.g., fax deposit retrieval, voice to email, etc.). Carrier AS 140 may facilitate tool free call processing.

E. Services Creation Environment (SCE)

SCE 134 provides a foundation for rapid development of next generation services. SCE 134 may support Java Specification Request (JSR) 116 SIP Servlet and a suite of externalized application programming interfaces (APIs) for developers to gain access to the IMS platform. A single SCE 134 may support a number of macro application servers and may support the building of micro applications.

F. Services

The IMS core may support a number of different services, such as GLMS 142, Presence 144, and ENUM server 146. GLMS 142 may include one or more services that allow for group list creation, management, and use across multiple applications within IMS. GLMS 142 may enforce access and visibility rules. Presence 144 may include one or more services that automate the task of aggregating both presence and availability information. Presence 144 may inform one user about the status of another user's availability and willingness to communicate. Presence servers 144 may use the Presence User Agent (PUA) to manage the presence of the IMS users and handle presence subscription requests. For example, an application or an IMS subscriber may act as a watcher, which is an entity that subscribes to presence information provided by Presence Server 144. ENUM server 146 may provide translation of E.164 to SIP URIs. BIGCF 122 and S-CSCF 102 may query ENUM server 146 to determine a next hop for a call. In some implementations consistent with principles of the invention, BIGCF 122 may execute ENUM queries for both calling and called number resolution.

G. Border Elements

The IMS core may include one or more session border controllers (SBCs) that provide control of the boundary between different service provider networks, provide signaling protocol inter-working between the SIP-based IMS platform and other service provider networks, control the transport boundary between service provider networks, and provide usage metering and Quality of Service (QoS) measurements for media flows. Two types of SBCs that may be implemented in the IMS platform are the access session border controller (A-SBC) 148 and the I-SBC 150.

A-SBC 148 may correspond to an ingress point to the IMS platform for Customer Premises Equipment (CPE) traffic, with the exception of the wholesale gateway. A-SBC 148 may provide SIP aware firewall capabilities that support network address translation (NAT), prevent denial of service (DoS) attacks, and execute other security enforcement features. A-SBC 148 may be the first SIP events normalization point prior the IMS platform.

Internetworking session border controller (I-SBC) 150 may serve as a connection point between the IMS platform and the wholesale gateway and also between the IMS platform and IP peering VoIP carriers. I-SBC 150 may provide SIP normalization and Topology Hiding and Internetwork Gateway (THIG) services. In one implementation, I-SBC 150 may be replaced by or supplemented with a border gateway function (BGF).

H. Policy

System 100 may include a number of policy components. For example, system 100 may, as illustrated in FIG. 1, include a policy engine 152, a PDF 154, and a RM 156. Policy engine 152 may include one or more rule-based engines that govern subscriber access to the IMS platform, subscriber access to resources, and routing decisions for several different types of event requests made within the IMS platform. In one implementation, policy engine 152 may provide decision logic to decision and policy points within the IMS platform. PDF 154 may correspond to a Policy Decision Point (PDP) for service-based local policy control. PDF 154 may make policy decisions based on session and media related information. PDF 154 may exchange this decision information with another IMS element (such as A-SBC 148 or I-SBC 150) to control the flow and characteristics of the communication link. RM 156 may be used to execute a policy at the component level. As illustrated in FIG. 1, RM 156 may be associated with, for example, S-CSCF 102, BIGCF 122, A-SBC 148, and I-SBC 150. In one implementation, RM 156 may store and execute the policy decisions that are relevant for the location at which RM 156 is associated.

I. Charging Function (CF)

CF 158 may include a unified system for affecting both offline charging and online charging. Offline charging is a process where charging information for network resource usage is collected concurrently with that resource usage. The charging information may be passed through a chain of CFs 158. At the end of this process, Call Detail Record (CUR) files may be generated by the network, which are then transferred to the network operator's billing domain for the purpose of subscriber billing processing which may include rating and rendering.

Online charging is a process where charging information can affect, in real time, the service rendered. Support of this capability requires direct interaction between the charging mechanism and the network's session control mechanism. An example of online charging includes pre-paid calling card usage.

CDF 160 may compile chargeable events gathered from IMS components into a single CDR for offline billing activities. CDF 160 may gather the chargeable events from a Charging Trigger Function (CTF) that may be associated with components of system 100 and, after creating the CDR, pass the billing data to the CGF 162.

CGF 162 may act as a gateway between both the offline charging system, the online system, and an external post-processing system, such as the billing domain.

J. The Generic User Profile (GUP)

Information related to IMS subscribers may be in many formats, managed by many network elements and administrations. This complicates access to that data for users, network elements and value added service providers. The Generic User Profile (GUP) addresses these issues and provides a common conceptual description of subscriber data. A GUP server may provide a means to access the data described in the GUP.

Exemplary Configuration of ENUM Server

Figure 2:
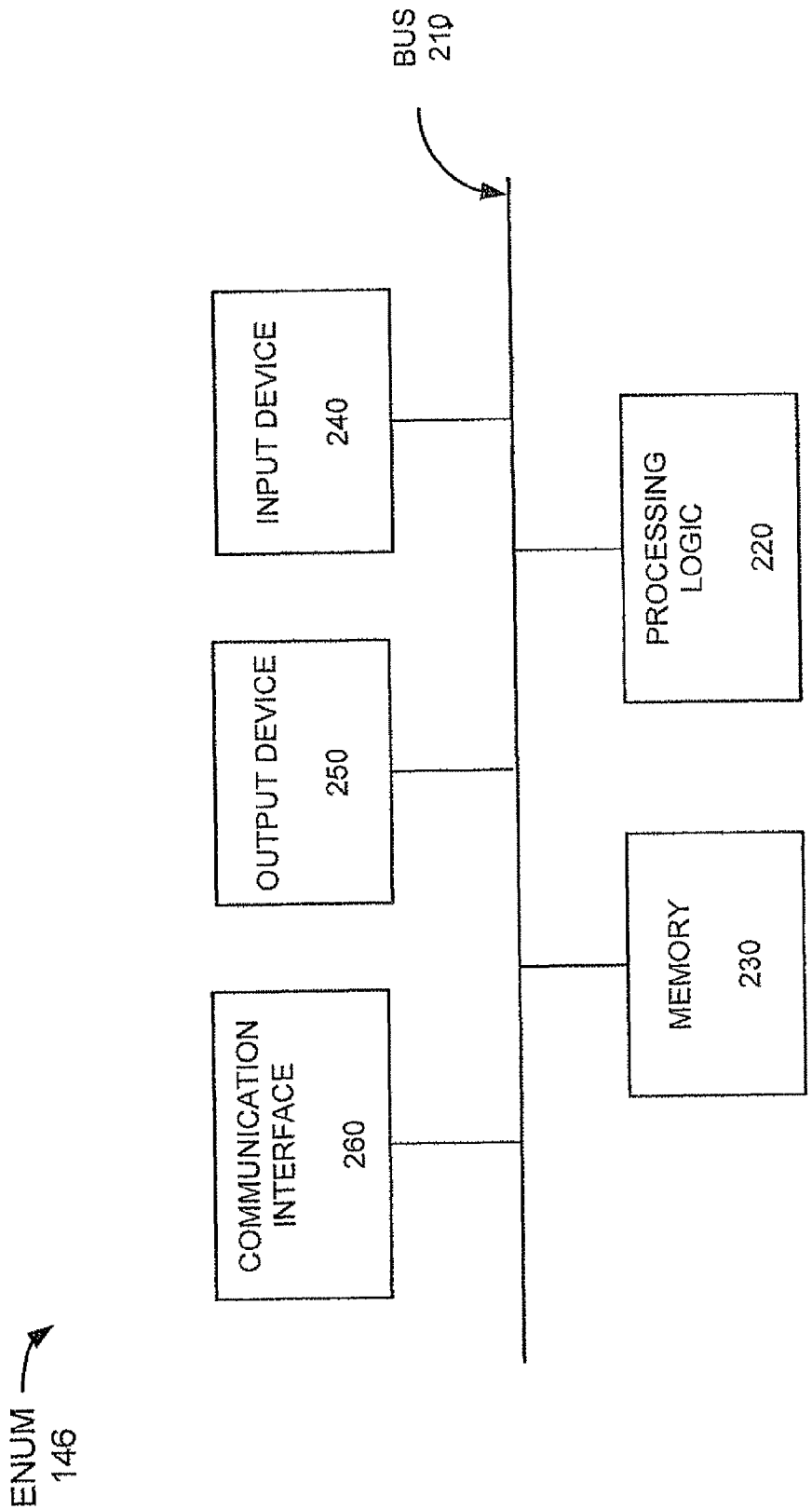
FIG. 2 illustrates an exemplary configuration of the telephone number mapping server of FIG. 1.

FIG. 2 illustrates an exemplary configuration of ENUM server 146. As illustrated, ENUM server 146 may include a bus 210, processing logic 220, a memory 230, an input device 240, an output device 250, and a communication interface 260. It will be appreciated that ENUM server 146 may include other components (not shown) that aid in receiving, transmitting, and/or processing data. Moreover, it will be appreciated that other configurations are possible.

Bus 210 may permit communication among the components of ENUM server 146. Processing logic 220 may include any type of processor or microprocessor that interprets and executes instructions. In other implementations, processing logic 220 may be implemented as or include an application specific integrated circuit (ASIC), field programmable gate array (FPGA), or the like. Memory 230 may include a random access memory (RAM) or another type of dynamic storage device that stores information and instructions for execution by processing logic 220, a read only memory (ROM) or another type of static storage device that stores static information and instructions for the processing logic 220, and/or some other type of magnetic or optical recording medium and its corresponding drive for storing information and/or instructions.

Input device 240 may include a device that permits an operator to input information to ENUM server 146, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables ENUM server 146 to communicate with other devices and/or systems. For example, communication interface 260 may include mechanisms for communicating with other components within system 100.

As will be described in detail below, ENUM server 146 may perform processing associated with routing calls to and from various parties. ENUM server 146 may perform these and other functions in response to processing logic 220 executing software instructions contained in a computer-readable medium, such as memory 230. A computer-readable medium may be defined as one or more memory devices and/or carrier waves. The software instructions may be read into memory 230 from another computer-readable medium or from another device via communication interface 260. The software instructions contained in memory 230 may cause processing logic 220 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Exemplary Processing

Numbers in E.164 format are globally unique, language independent identifiers for resources on public telecommunication networks that can support many different services and protocols. E.164 is controlled by the International Telecommunication Union (ITU). Currently, many IMS subscribers that wish to establish a session may be identified via an E.164 number (also referred to as the subscriber public ID), as opposed to a URI. Therefore, system 100 may support the establishment of sessions to terminals identified by E.164 numbers, as described in detail below.

System 100, and more particularly ENUM server 146, may perform processing associated with performing ENUM related mappings, such as mappings from E.164 numbers to URIs. This processing is referred to herein as "infrastructure ENUM". Infrastructure ENUM is based on formats and procedures defined in the Internet Engineering Task Force (IETF) Request for Comments (RFC) 3761. However, ENUM server's 146 application of those formats and procedures (i.e., formats and procedures specified in RFC 3761) may not be strictly consistent with the objectives defined in RFC 3761. For example, RFC 3761 defines the translation of E.164 numbers into URIs that identify an individual subscriber (known as Addresses of Record or AORs). These URIs can then be routed using the mechanisms in RFC-3261 and RFC-3263. Such an implementation is sometimes referred to as "user ENUM". Conceptually, user ENUM is an end-user service. As such, the presence and nature of translation logic associated with a given E.164 number, may be determined by the subscriber to whom the number is allocated. Infrastructure ENUM, in contrast, is a network routing mechanism. Infrastructure ENUM translations will typically exist for all active E.164 numbers. Translation details for a given number may be determined by the entity to whom the number is assigned, e.g., by the national Numbering Plan Administrator, an agent acting on behalf of such an entity, or an entity to whom that entity has delegated responsibility for the number. Infrastructure ENUM utilizes similar translation mechanics as user ENUM, but the resulting URI does not necessarily identify an end user. The translation logic associated with a given E.164 number may identify (directly or indirectly) a network element to which the session request should be forwarded for subsequent processing. ENUM server 146 and other components in system 100 perform infrastructure ENUM related processing and resolve any potential conflicts between user ENUM processing and infrastructure ENUM processing.

Figure 3:
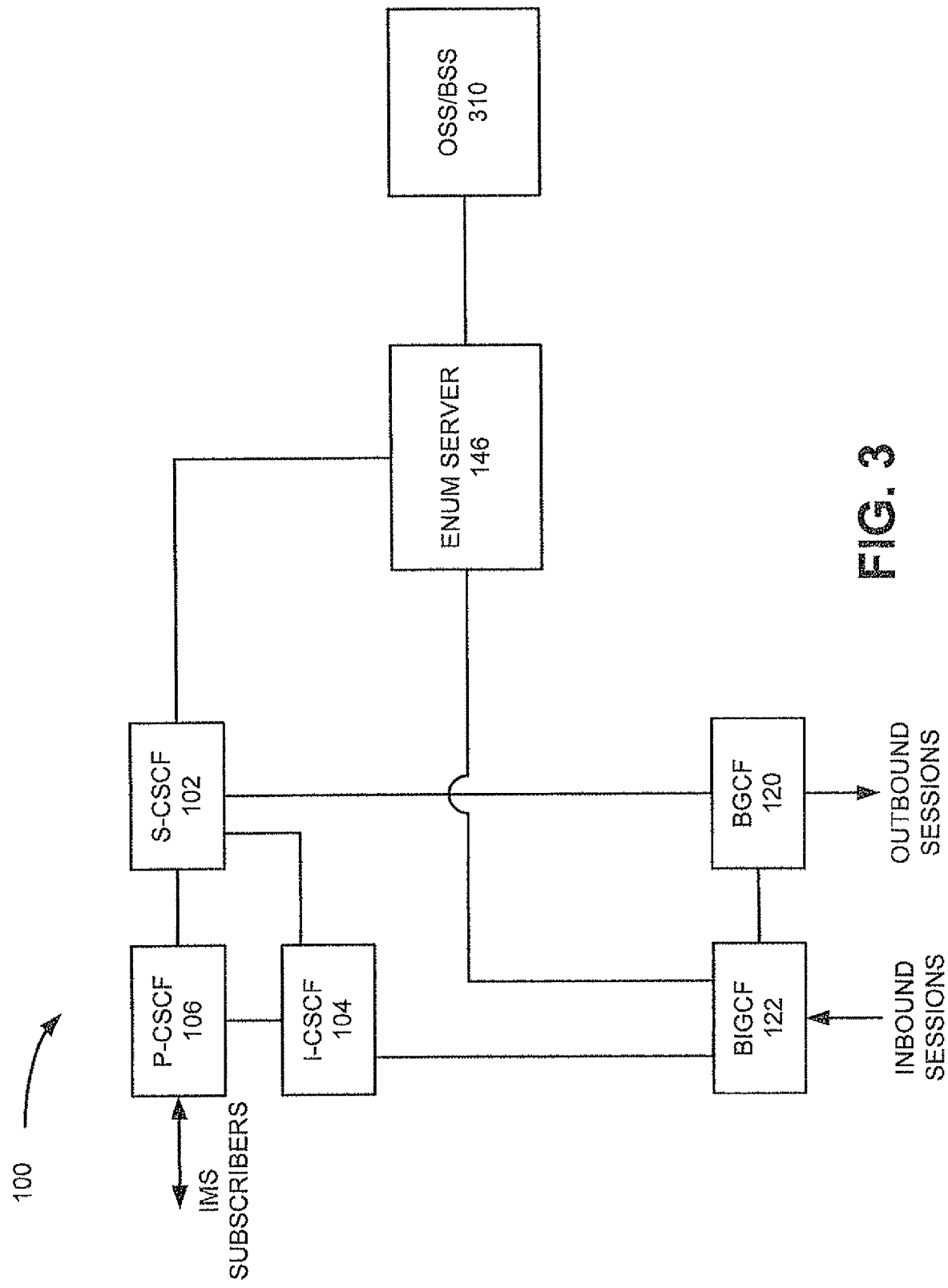
FIG. 3 illustrates a portion of the system of FIG. 1.

FIG. 3 is a block diagram illustrating an exemplary portion of system 100 associated with performing ENUM related processing, and in particular, infrastructure ENUM related processing. Referring to FIG. 3, the portion of system 100 illustrated includes S-CSCF 102, I-CSCF 104, P-CSCF 106, BGCF 120, BIGCF 122, ENUM server 146 and operations support system (OSS)/business support system (BSS) 310. ENUM server 146 may be coupled to S-CSCF 102 and BIGCF 122. S-CSCF 102 and BIGCF 122 may communicate with ENUM server 146 via, for example, DNS protocol. S-CSCF 102, I-CSCF 104, P-CSCF 106, BGCF 120 and BIGCF 121 may communicate with each other using, for example, SIP signaling. ENUM server 146 is also shown as being coupled to OSS/BSS 310. In an exemplary implementation, OSS/BSS 310 may transmit provisioning and/or configuration information to ENUM server 146 and ENUM server 146 may transmit logs, alarms and/or various metrics to OSS/BSS 310, as described in more detail below.

ENUM server 146 performs a number of functions associated with infrastructure ENUM. The infrastructure ENUM related processing may service internal routing functions and inter-carrier routing functions. For example, ENUM server 146 may translate E.164 routing numbers, including pooled and/or ported numbers, to URIs for routing purposes. ENUM server 146 may also include a provisioning interface for populating the naming authority pointer (NAPTR) records into an ENUM database (not shown in FIG. 3). ENUM server 146 may further provide alarming and performance management functions and configuration management functions associated with OSS/BSS 310. ENUM server 146 may further provide DNS server functionality consistent with RFC 1034 and RFC 1035.

As described above, ENUM server 146 provides internal routing information as well as routing information for use between a set of peering service providers, such as VoIP service providers. For example, infrastructure ENUM may be intended for service provider internal routing and/or for use between a set of peering VoIP service providers. The DNS NAPTR queries may be based on a common top level domain (TLD) that is agreed to by the peering partners. In this configuration, each party manages its own ENUM translation data within a set of ENUM servers for which it has administrative authority. Queries for translation information associated with numbers assigned to other carriers are forwarded to and answered by servers associated with those carriers. Alternatively, the peering partners may share their ENUM translation data, with each storing data from all parties with which it has executed a peering agreement, within a set of servers for which it has administrative authority, and under a "private" TLD of its choosing. In either implementation, the selected TLD may not be E164.arpa domain so that it does not conflict with user ENUM. The TLD may also use a non-public root, such as a root that is not .com, .edu, .gov, etc., to ensure that the data is not accessible to the public.

Figure 4A:
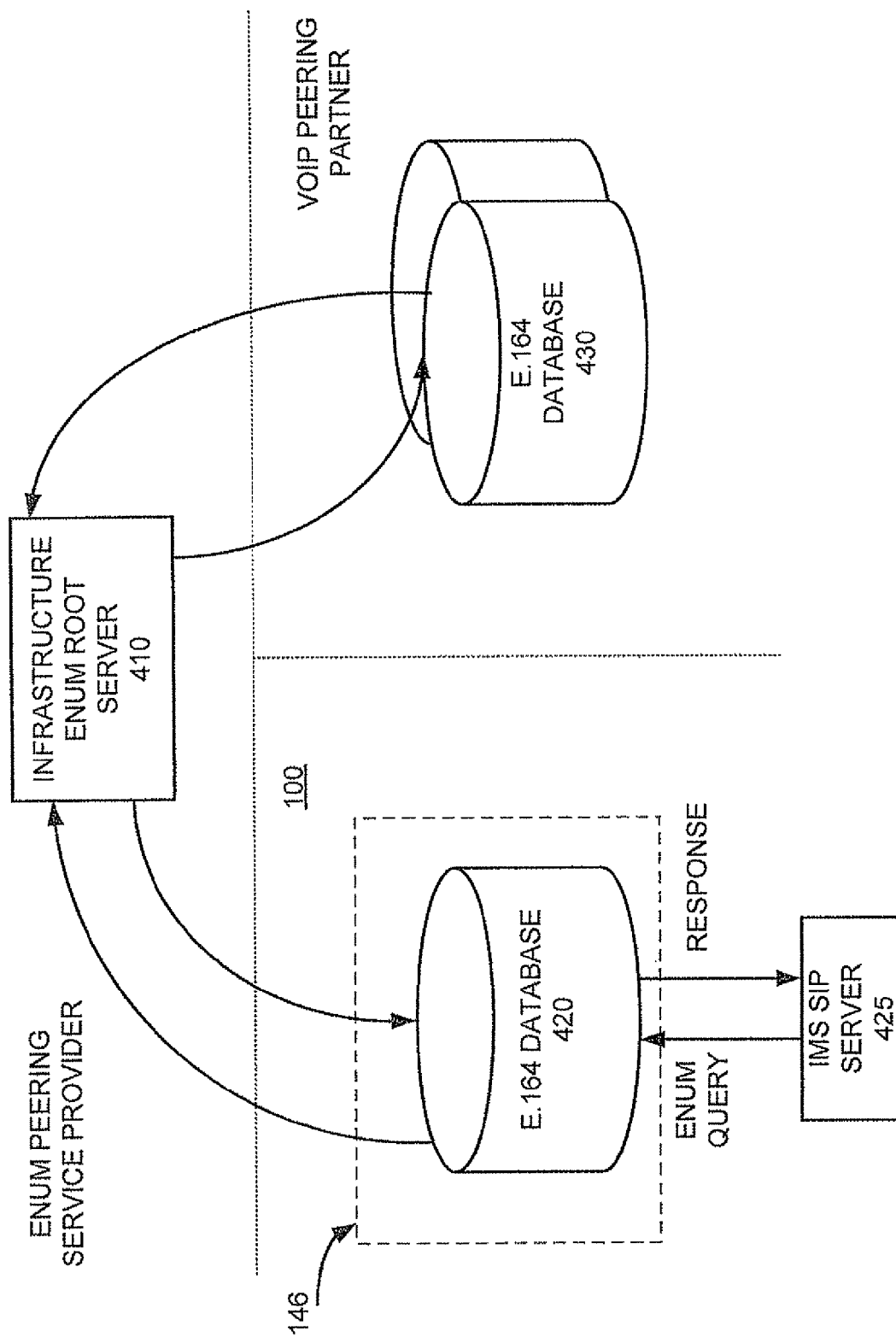
FIGS. 4A and 4B illustrate exemplary relationships between telephone number mapping databases and a telephone number mapping root server associated with a peering service provider.

In a configuration involving a shared TLD, a DNS peering provider accessible to system 100 and its VoIP peering partners may host the domain root. For example, FIG. 4A illustrates infrastructure ENUM root server 410 coupled to E.164 database 420 and E.164 database 430. E.164 database 420 may be implemented within ENUM server 146 or may be a database accessible to ENUM server 146. E.164 database 430 may be associated with a VoIP peering partner. E.164 database 420 may receive an ENUM query from IMS SIP server 425. IMS SIP server 425 may represent, for example, BIGCF 122, S-CSCF 102 or another SIP server in system 100. E.164 database 420 may perform hierarchical, recursive DNS resolution by communication with ENUM root server 410 if a particular E.164 number is not included in E.164 database 420. Similarly, E.164 database 430 may perform hierarchical, recursive DNS resolution with ENUM root server 410. The ENUM peering service provider may also provide additional services, such as support for routing of ported numbers.

In a configuration in which each peering partner stores Infrastructure ENUM translations for its own numbers as well as numbers assigned to its peering partners under a private TLD, each partner may determine, for every E.164 number or block of E.164 numbers over which it has authority, the URI(s) to which the number(s) should translate in response to a query from each of its peering partners. Each partner may then produce the corresponding data and provide the appropriate subset to each other partner. In return, each partner may expect to receive equivalent translation data from the other partners, which it may store in its local database 420. This process of formulating and exchanging Infrastructure ENUM translations, which may be repeated periodically, may be facilitated by a DNS peering provider accessible to system 100 and its VoIP peering partners. Such a DNS peering provider may also provide certain value-added functions, such as normalization of ported and pooled numbers. E.164 database 420 may receive an ENUM query from IMS SIP server 425. IMS SIP server 425 may represent, for example, BIGCF 122, S-CSCF 102 or another SIP server in system 100. Since E.164 database 420 contains translation data from all peering partners, it may resolve this query without requiring access to any external data store. Similarly, E.164 database 430 may resolve all queries coming from SIP servers in its domain, without requiring access to external data stores.

In an exemplary implementation of the "shared TLD" configuration, the URI to which a given E.164 number is translated may be different if that number is assigned to the entity responsible for system 100, than if it is not. For example, the URI returned in response to a query specifying a number assigned to the entity responsible for E.164 database 420 may identify an element within system 100, whereas the URI returned in response to a query for a number assigned to another operator may (at the discretion of that operator) identify an element in that operator's network. System 100 may therefore implement a type of policy using a configuration referred to herein as "split-DNS". Split DNS may use two sets of DNS servers, one for internal use and one for external use.

Figure 4B:
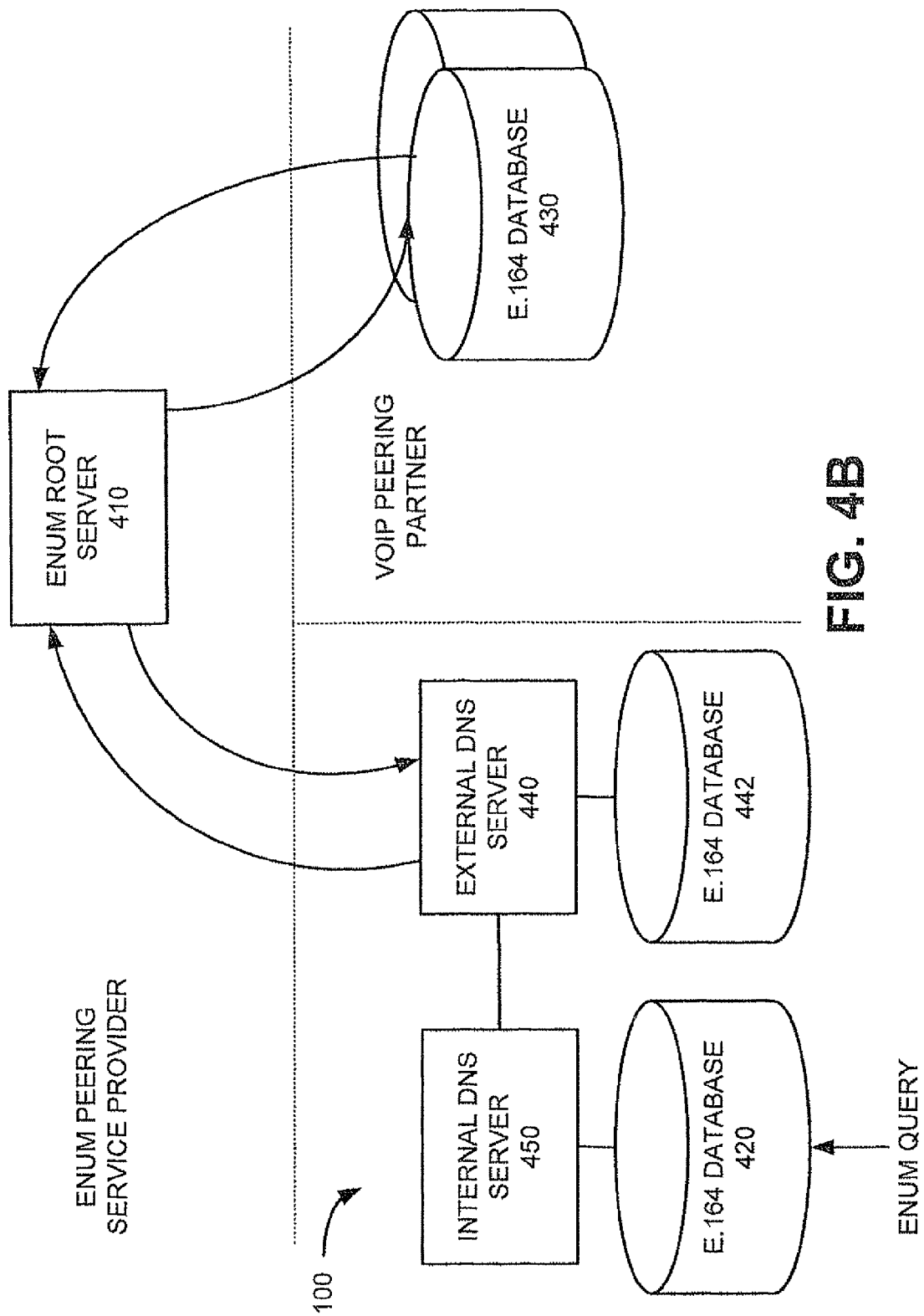

For example, FIG. 4B illustrates a split-DNS implementation. Referring to FIG. 4B, system 100 may include external DNS server 440, E.164 database 442, internal DNS server 450 and E.164 database 420. A firewall or other security device may be located between servers 440 and 450 to prevent unauthorized access to DNS server 440. The VoIP peering partner illustrated in FIG. 4B to the right of the dotted line may be configured in a manner similar to system 100. External DNS server 440 may connect to ENUM root server 410 and may receive queries from outside system 100. External DNS server 440 may also be coupled to E.164 database 442. Internal DNS server 450 and/or E.164 database 420 may be accessible from within system 100. Internal DNS server 450 may be populated with data that gives details for the routing of calls within system 100. The set of E.164 numbers for which translations are configured in external DNS server 440 may overlap set of E.164 numbers for which translations are configured in internal DNS server 450. However, the URI(s) returned by DNS servers 440 and 450 may be different. For example, external DNS server 440 may, in response to queries specifying numbers assigned to the owned by an entity responsible for system 100, return the URI of an I-SBC within system 100, whereas internal DNS server 450 may return the URI of an I-CSCF 104 or wholesaler gateway addresses.

Devices within system 100 may be configured to use internal DNS server 450. Internal DNS server 450 may forward queries that it cannot resolve to external DNS server 440. External DNS server 440 may participate in DNS hierarchical resolution using ENUM root server 410 and DNS servers of VoIP service provider peers (e.g., VoIP peering partners).

Since user ENUM and infrastructure ENUM serve different needs and are populated with different data, there may be discrepancies between the results from user ENUM and infrastructure ENUM queries for the same E.164 number. These discrepancies may result in identifying different routing logic and may identify different providers for services to which a user has subscribed. To resolve these discrepancies, system 100 may handle user ENUM as a terminating network issue. That is, only the service provider to which the particular number is assigned would perform user ENUM lookup. This helps ensure that the terms of peering agreements are honored, thereby avoiding scenarios where user ENUM results would result in the bypassing of a VoIP peer's network.

System 100 may also utilize only infrastructure ENUM routing and IMS service configuration for internal IMS users, thereby maintaining vertical service integration. The entity/service provider associated with system 100 may also utilize both infrastructure and user ENUM routing, as well as user ENUM service configuration, for internally owned numbers for non-IMS subscribers. This allows the service provider to offer non-IMS VoIP services in which user ENUM may play a more significant role.

FIG. 5 is a flow diagram illustrating exemplary processing associated with calls received by system 100. Processing may begin with BIGCF 122 receiving a call (act 510). The call may arrive, for example, from an external origination, such as a wholesale subscriber, an ingress PSTN gateway, a Class 3 network, a Class 5 network, etc. BIGCF 122 may then perform an infrastructure ENUM lookup based on both the calling party number and the called party number. For example, BIGCF 122 may send a DNS NAPTR query to ENUM server 146 that identifies the calling party number (act 510) BIGCF 122 may also send, or alternatively send, a separate DNS NAPTR query to ENUM server 146 that identifies the called party number (act 510). In still another implementation, BIGCF 122 may send a single DNS NAPTR query to ENUM server 146 that includes both the calling and called party numbers. ENUM server 146 may receive the DNS NAPTR query(ies) (act 520). ENUM server 146 along with BIGCF 122 may determine if the call is to be served by the IMS core (act 530).

For example, in one implementation, if the calling party number is not associated with an IMS profile that invokes an IMS application, the called party number is not associated with an IMS subscriber or the called party is not associated with an IMS profile that invokes an IMS application, the call may not be served by the IMS core. Assume that the call is not served by the IMS core. In this case, ENUM server 146 may return a response to BIGCF 122 that includes a URI that identifies an element outside of the IMS core (act 540). For example, ENUM server 146 may identify a URI pointing to a gateway of a wholesale subscriber (e.g., sip: CdPN@gateway.wholesaler.com, where "CdPN" represents the called party E.164 number).

BIGCF 122 may receive the response from ENUM server 146 and route the call accordingly. In this case, the call may be routed outside the IMS core. That is, BIGCF 122 routes the call to the entity identified by the URI in the ENUM query response, which in this example has the effect of bypassing the IMS core (act 550). For example, BIGCF 122 may (if no URI was returned in the ENUM query response) forward the call to BGCF 120 for routing to an appropriate PSTN termination point or to an appropriate I-SBC 150 if the URI in the ENUM query response identified a wholesale gateway or IP-based carrier termination point.

If the call is to be routed to the IMS core, ENUM server 146 may return a response that identifies an element in the IMS core (act 560). For example, ENUM server 146 may return a URI identifying an element in the IMS core, (e.g., sip: CdPN@icscfl.21.sip.com). In this example, the message indicates that the call is to be routed to I-CSCF 104.

BIGCF 122 may receive the response with the URI and route the call to the IMS core, (i.e., I-CSCF 104 in this example) for terminating subscriber feature processing (act 570). The terminating subscriber feature processing may include, for example, an application executed by the IMS core, such as text-to-speech conversion, IVR, ASR, multimedia conferencing, etc. In each case, the appropriate element in IMS core may invoke the appropriate IMS service(s), forward the request to the appropriate element and/or forward the call toward the appropriate IMS subscriber.

Figure 6:
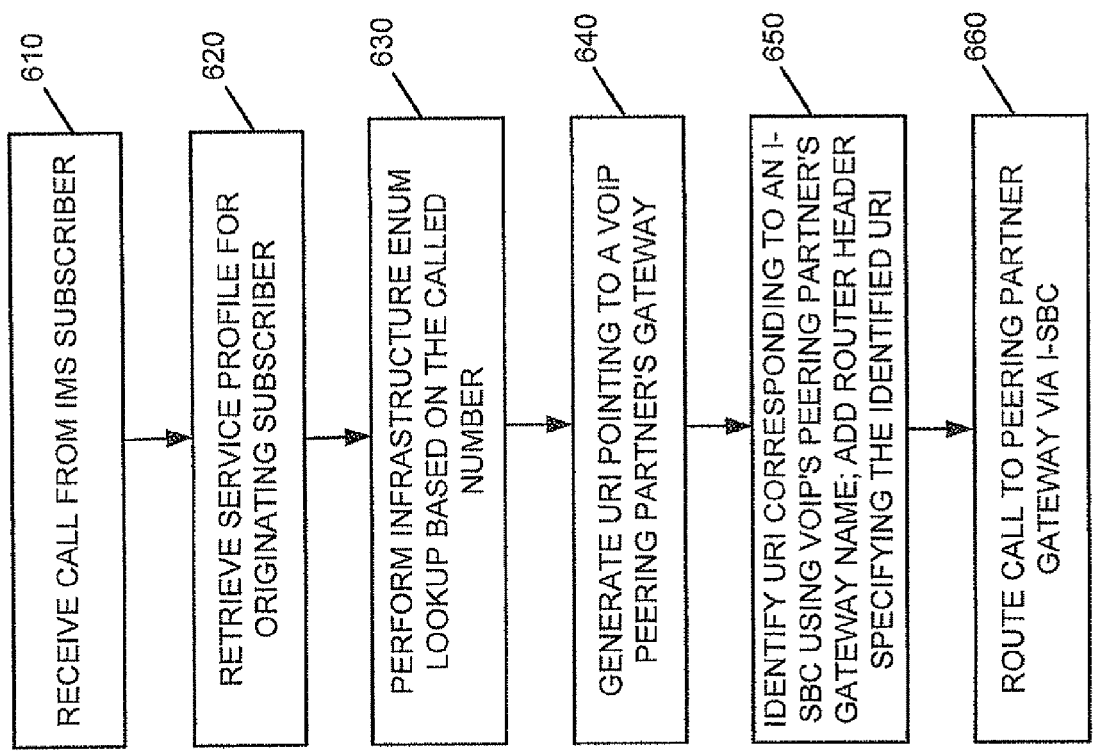

The processing described above with respect to FIG. 5 involves an inbound call received from outside the IMS core from, for example, a non-IMS subscriber. FIG. 6 illustrates exemplary processing associated with an inbound call that is received by the IMS core from a registered subscriber.

Processing may begin with receiving a call from a registered IMS subscriber (act 610). The call message may be sent from, for example, P-CSCF 106, to, for example, S-CSCF 102. S-CSCF 102 may retrieve a service profile for the originating subscriber (act 620). For example, S-CSCF 102 may access HSS 108 to determine if HSS 108 includes an IMS profile for the destination number (i.e., the called party number). Assume that S-CSCF 102 cannot find an IMS profile for the called party number in HSS 108.

S-CSCF 102 may then perform an infrastructure ENUM lookup based on the called party number (act 630). For example, S-CSCF 102 may send a DNS NAPTR query to ENUM server 146 that includes the called party number. ENUM server 146 may receive the DNS NAPTR query and generate a URI pointing to, for example, a VoIP peering partner's gateway (act 640). Alternatively, the URI may point to a PSTN destination gateway. ENUM server 146 may then forward the response to S-CSCF 102.

Assume that ENUM server 146 generates a URI pointing to a VoIP peering partner's gateway. S-CSCF 102 may then look up a URI identifying, for example, an I-SBC, using the VoIP peering partner's gateway name as a search key into a local table (act 650). S-CSCF 102 may then identify a URI from the local table and add a route header specifying this URI to the signaling message (act 650). S-CSCF 102 may then route the call to the peering partner gateway via the I-SBC determined at act 650 (act 660).

In some implementations, the infrastructure ENUM lookup based on the called number at act 630 may result in ENUM server 146 returning a "void" response. For example, this may occur when the called number is out of service. In this case, S-CSCF 102 may terminate the call.

ENUM server 146, as discussed above, supports route lookup for both IMS subscribers and non-subscribers. ENUM server 146 may also perform a number of other functions/processes. For example, ENUM server 146 may implement the Dynamic Delegation Discovery System (DDDS) as defined in IETF RFC 3401, 3402, 3403, 3404 and 3405. ENUM server 146 may perform batch processing for uploading the mapping of E.164 numbers and NAPTR resource records. ENUM server 146 may also include an administrative interface allowing for manual updating of E.164 and NAPTR mapping.

ENUM server 146 may further perform validation of the format of the URI in the NAPTR resource records and rejection of the NAPTR resource records that contain incorrect URI format. ENUM server 146 may also provide support for mapping one E.164 numbers to multiple NAPTR resource records.

ENUM server 146 may also provides support of the "SIP" Enumservice specified in IETF RFC3764 and support of the "VOID" Enumservice. ENUM server 146 may further support mapping policies that allow for resolving NAPTR record by using any number of digits up to, for example, 15-digits. ENUM server 146 may also support negative response caching and support for * records (i.e., wildcards) as per RFC 1034.

As discussed in FIGS. 5 and 6, various conditions, coupled with operator policy, govern the response from ENUM server 146. Table 1 below provides exemplary ENUM responses to a variety of different numbers.

TABLE 1

Summary of ENUM Responses

| Type of Number | ENUM Response |
| --- | --- |
| IMS Subscriber Number | URI pointing to I-CSCF |
| VoIP Wholesale Number - No IMS Features | URI pointing to VoIP wholesaler interconnect gateway |
| VoIP Wholesale Number with IMS Features | URI pointing to I-CSCF |
| Number owned by VoIP Peering Partner | URI point to Peering Partner Interconnect gateway |
| Number is owned by entity associated with IMS but not in service | Enumservice "VOID" |
| Number not registered in infrastructure ENUM | DNS NXDOMAIN (No such domain) Response |

BIGCF 122 may use the responses from the two NAPTR queries (i.e., called number query and calling number query) to route calls to either the IMS core (e.g., towards I-CSCF 104) or away from the IMS core (e.g., towards the BGCF 120).

As described above, the infrastructure ENUM configuration of a set of operators offering IP-based services (e.g., VoIP) and wishing to exchange associated information flows via IP (i.e., "peering partners") may be implemented using either a shared Top-Level-Domain (TLD) or private TLDs. The shared-TLD configuration may be implemented using a split-DNS structure. In either shared-TLD or private-TLD configuration, the responses returned to queries from a peering partner may be different from those returned in response to queries from within system 100.

Further, to work in a peering environment, ENUM server 146 may provide the following security features:

a) The data populated in the DNS tables may not include confidential information about subscribers;

b) Data that can be queried by external parties may not include information revealing proprietary properties of system 100. For instance, URIs exposed externally (those corresponding to I-SBCs) may use names that do not reveal network topology;

c) Internal ENUM server(s) 146 may be configured to accept DNS queries only from an approved set of components of system 100. This may be accomplished through direct configuration of the server or by access control lists implemented in IP network security control points. The set of approved components for internal DNS servers may include, for example, S-CSCF 102 and BIGCF 122. In addition to the above, the approved set of components for the external ENUM servers may be limited to a set of devices explicitly identified by the VoIP peering partners.

In the "private TLD" configuration, OSS/BSS 310 (FIG. 3) may populate the ENUM peering service provider database with ENUM data associated with system 100. The peering service provider may augment this data, e.g., with Local Number Portability information, and the merged data may be pushed into the real-time name servers.

ENUM server 146 may also provide tools to view the following performance-related system information in real-time: system up-time, summary of successful queries, summary of unsuccessful queries and system utilization percentage (processor and storage). ENUM server 146 may further provide logging and metrics to assist with performance management.

For example, ENUM server 146 may log requests and responses with configurable logging data content, i.e., the log's fields may be configurable. The logging may be written to persistent storage with periodically incremented file identifiers, e.g., daily log files. The file period and minimum/maximum file sizes may be configurable and ENUM server 146 may support logging to off-platform persistent storage as an option.

ENUM server 146 may also support a number of configuration management features. For example, ENUM server 146 may support, for example, simple object access protocol (SOAP) or plain XML/HTTP provisioning application programming interfaces (APIs) that allow for full remote configuration of ENUM server 146, including loading and changing DNS records. ENUM server 146 may also support a command line-based configuration and management console, a graphical user interface (GUI)-based configuration and management console and a configuration and management console that is capable of managing multiple instances of the ENUM server 146 from a single console and batch processing for uploading the NAPTR resource records.

ENUM server 146 may also support fault management functions. For example, ENUM server 146 may generate alarms to identify problems in at least the following areas: network interface, disk capacity utilization and unsuccessful query count exceeded configurable threshold. ENUM server 146 may also provide tools to view fault-related system information in real-time, such as alarm count by severity.

CONCLUSION

Implementations described herein provide for routing calls through an IMS core or outside the IMS core. For example, if a call involves an IMS subscriber or invokes an IMS application, an ENUM server may provide routing information that indicates that the call is to be routed through the IMS core. If, however, a call does not involve an IMS subscriber or invoke an IMS application, the ENUM server may identify routing information that results in routing outside the IMS core.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

For example, a single ENUM server is illustrated in FIG. 1 for simplicity. In some implementations, a number of ENUM servers may be used. In addition, the call routing situations described above are provided for explanatory purposes only. Other calls/call routing situations involving IMS subscribers, non-IMS subscribers, peering parties, PSTN parties, etc., may also be processed in implementations consistent with the invention.

In addition, while series of acts have been described with respect to FIGS. 5 and 6, the order of the acts may be varied in other implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an application specific integrated circuit, or a field programmable gate array, software, or a combination of hardware and software.

Aspects of the invention described herein are generally applicable to multimedia sessions implemented over an Internet Protocol infrastructure which uses E.164 numbers to identify endpoints. Neither the usage of terms frequently associated with telephony (e.g., "call"), nor the historic association of E.164 numbers with such services, limits the scope or applicability of this invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is to mean "based, at least in part, on" unless explicitly stated otherwise.

What is claimed is:

1. A system comprising:
at least one device to:
receive at least one query from an Internet protocol multimedia subsystem (IMS) component, the at least one query being associated with a call, and
forward routing information to the IMS component based on the at least one query, the routing information indicating that processing associated with routing the call is to bypass a portion of the IMS associated with providing IMS related services when the calling party does not invoke an IMS related service, the called party does not invoke an IMS related service, and the called party is not an IMS subscriber.

2. The system of claim 1, where the at least one device comprises a telephone number mapping server to:
translate E.164 numbers to uniform resource identifiers.

3. The system of claim 2, where the telephone number mapping server is to:
receive a first query, the first query including a calling party number,
identify a first uniform resource identifier for the calling party number,
receive a second query, the second query including a called party number,
identify a second uniform resource identifier for the called party number, and
forward the first and second uniform resource identifiers to the IMS component.

4. The system of claim 1, where the at least one device is further to:
route the call through a portion of the IMS associated with providing IMS related services when the calling party invokes an IMS related service, when the called party invokes an IMS related service, or when the called party is an IMS subscriber.

5. The system of claim 1, where the portion of the IMS associated with providing IMS related services comprises:
a plurality of call session control components, and
where the routing information does not identify any of the call session control components when the call is to bypass the portion of the IMS associated with providing IMS related services.

6. The system of claim 1, where the at least one device comprises:
a telephone number mapping server, and
a database storing E.164 numbers and corresponding uniform resource identifiers, where the telephone number mapping server is to map a received E.164 number associated with the call to a uniform resource identifier.

7. The system of claim 6, where the telephone number mapping server is further to:
communicate with a telephone number mapping root server associated with a peering service provider and a telephone number mapping server operated by a peering partner to identify the uniform resource identifier associated with the call.

8. The system of claim 6, where the telephone number mapping server is further to:
store telephone number mapping information for numbers belonging to a local operator and a set of peering partners, and
resolve queries for the numbers belonging to the local operator and the set of peering partners without communicating with other servers.

9. The system of claim 1, where the at least one device comprises:
a first domain name system server to store E.164 numbers associated with the IMS, and
a second domain name system server to identify uniform resource identifiers associated with parties outside the IMS.

10. The system of claim 9, where the second domain name system server is to communicate with entities outside the IMS to resolve a received telephone number mapping query associated with a call from a party outside the IMS.

11. A method, comprising:
receiving a telephone number mapping query, the query being associated with a call;
generating routing information based on the query; and
forwarding the routing information to a control device, the routing information indicating that processing associated with routing the call is to bypass a core portion of an Internet multimedia subsystem (IMS) when a calling party associated with the call does not invoke an IMS service, the called party associated with the call does not invoke an IMS service, and the called party is not an IMS subscriber.

12. The method of claim 11, where the generating routing information comprises:
mapping a first E.164 number associated with the calling party to a first uniform resource identifier, and
mapping a second E.164 number associated with the called party to a second uniform resource identifier.

13. The method of claim 12, further comprising:
forwarding the first and second uniform resource identifiers to the control device;
receiving, by the control device, the first and second resource identifiers; and
routing the call by bypassing the core portion of the IMS based on the first and second uniform resource identifiers.

14. The method of claim 11, further comprising:
routing the call through the core portion of the IMS when the calling party invokes an IMS service, the called party invokes an IMS service or the called party is an IMS subscriber.

15. The method of claim 11, where the generating routing information comprises:
communicating with a telephone number mapping root server to identify a uniform resource identifier associated with the call.

16. The method of claim 11, where the generating routing information comprises:
accessing a first database to store E.164 numbers associated with the IMS, and
accessing a second database to store E.164 numbers associated with parties outside the IMS when the first database does not store an E.164 number associated with the call.

17. The method of claim 16, where the generating routing information further comprises:
communicating with entities outside the IMS to resolve the query when the call is from a party outside the IMS.

18. A method, comprising:
receiving a telephone number mapping query, the query being associated with a call from a calling party to a called party;
identifying a first uniform resource identifier associated with the calling party;
identifying a second uniform resource identifier associated with the called party;
forwarding the first and second uniform resource identifiers to a control device; and
routing the call to the called party, the routing bypassing a portion of the IMS associated with providing IMS related services when the calling party does not invoke an IMS related service, the called party does not invoke an IMS related service, and the called party is not an IMS subscriber.

19. The method of claim 18, where the identifying the first uniform resource identifier comprises:
mapping an E.164 number associated with the calling party to the first uniform resource identifier, and
where the identifying the second uniform resource identifier comprises:
mapping an E.164 number associated with the called party to the second uniform resource identifier.

20. The method of claim 18, where the identifying at least one of the first uniform resource identifier or the second uniform resource identifier comprises:
accessing a first database that stores E.164 numbers associated with the IMS, and
accessing a second database that stores E.164 numbers associated with parties outside the IMS when the first database does not store an E.164 number associated with the call.

21. The method of claim 18, where the identifying at least one of the first uniform resource identifier or the second uniform resource identifier comprises:
communicating with entities outside the IMS to resolve the query when the calling party or the called party is not an IMS subscriber.

* * * * *